United States Patent

Sayanagi et al.

Patent Number: 5,355,440
Date of Patent: Oct. 11, 1994

[54] COLOR IMAGE PROCESSING METHOD AND APPARATUS THEREFOR

[75] Inventors: Kazuo Sayanagi; Chiho Nakamura, both of Tokyo, Japan

[73] Assignee: Shaken Co., Ltd., Tokyo, Japan

[21] Appl. No.: 730,833

[22] PCT Filed: Dec. 4, 1990

[86] PCT No.: PCT/JP90/01568

§ 371 Date: Jul. 12, 1991

§ 102(e) Date: Jul. 12, 1991

[87] PCT Pub. No.: WO91/08520

PCT Pub. Date: Jun. 13, 1991

[30] Foreign Application Priority Data

Dec. 5, 1989 [JP] Japan .................. 1-316293

[51] Int. Cl.$^5$ .............................................. G06F 15/00
[52] U.S. Cl. .................... 395/109; 346/157
[58] Field of Search .............. 395/109, 101, 131; 346/154, 157; 358/75, 79, 80, 518, 520, 529, 533, 501-503; 355/80

[56] References Cited

U.S. PATENT DOCUMENTS 5,057,914  10/1991  Tsuji et al. ................. 358/80
5,121,146  6/1992   Hung et al. ................. 358/80

*Primary Examiner*—Arthur G. Evans
*Attorney, Agent, or Firm*—Koda and Androlia

[57] ABSTRACT

The invention relates to a color image processing method and apparatus therefor, in which dot area ratio is decided when color printing is performed using inks of the four colors yellow, magenta, cyan and black.

In color printing, in principle most colors can be printed by the superimposed printing of inks of the three colors Y, M, C.

However, when performing color printing using four colors, inclusive of black, it is difficult to decide the dot area ratio of each color for the purpose of reproducing a target color, and excellent color reproduction cannot always be obtained even if printing is performed at the dot area ratios decided by the conventional method.

Accordingly, the invention is adapted to decide area ratios $A_Y$, $A_M$, $A_C$, $A_K$ of the Y, M, C, K inks, which accurately reproduce a target color X, Y, Z, by a method based upon biquadratic Neugebauer equations with four unknowns using tristimulus values of 16 types of color points obtained from actual measurement of the Y, M, C, K inks employed in actual printing.

Excellent color reproduction can be achieved if color printing is carried out in accordance with each of the area ratios decided by the invention.

5 Claims, 4 Drawing Sheets

COLOR IMAGE PROCESSING METHOD AND APPARATUS THEREFOR

DESCRIPTION

Technical Field

This invention relates to a color image processing method and apparatus therefor, in which dot area ratio is decided by a color scanner when color printing is performed using inks of the four colors yellow (Y), magenta (M), cyan (C) and black (K).

Background Art

In color printing, in principle most colors can be printed by the superimposed printing of inks of the three colors Y, M, C.

However, the following problems are encountered with such three colors superimposed printing:

① trapping at the portions where the inks overlap is poor;
② the color deepest black cannot be reproduced well;
③ three ink colors need to be superimposed at the same location for black reproduction, which is uneconomical because a large amount of ink is used; and
④ image contrast is insufficient.

In general, therefore, attempts have been made to solve these problems by performing color printing using four colors, in which black (K) ink is added to the Y, M, C inks.

However, in a case where color printing is carried out with four colors inclusive of the color black, certain problems arise. Specifically, it is difficult to decide the dot area ratio of each color for the purpose of reproducing a target color, and excellent color reproduction cannot always be obtained even if printing is performed at the dot area ratios decided by the conventional method.

By way of example, one method of deciding dot area ratio according to the prior art is to obtain the ratio by inserting the R, G, B signals of the colors to be reproduced into the following masking equation:

$$\begin{bmatrix} Y \\ M \\ C \end{bmatrix} = \begin{bmatrix} a_{11} & a_{12} & a_{13} \\ a_{21} & a_{22} & a_{23} \\ a_{31} & a_{32} & a_{33} \end{bmatrix} = \begin{bmatrix} B \\ G \\ R \end{bmatrix}$$

Here $[a_{ij}]$ (i,j = 1, 2, 3) is a parameter referred to as a "masking coefficient". The dot area ratio of each of the three colors Y, M, C is obtained by appropriately deciding this parameter.

In the case of the four colors, Y, M, C, K, tentative dot area ratios for Y, M, and C are determined as set forth above; then the dot area ratio for K is obtained by multiplying the minimum value among those for Y, M and C with a certain black ratio. Then, the final area ratios for Y, M, and C are determined by subtracting the area ratio for K from their tentative ratio values.

Such a method has been quite well known with the name of UCR (Under color removal) for those skilled in the color printing, and has been widely implemented in various printers as is referred to in U.S. Pat. No. 5,057,914 to Ricoh Co.

However, the approach described above is based on the masking equation which is best applied to subtractive color mixing system as color photography.

It is well known that desirable color reproduction cannot be achieved by directly applying this approach to color printing that is based on dot area modulation and that involves in part additive color mixing.

Problems associated with the UCR method are described in U.S. Pat. No. 5,121,196 to Konica as follows:

① General tendency of saturation deterioration, and
② Density reduction toward darker areas The Konica patent proposes a solution for these disadvantages of the UCR method; it consists of preparing a series of color patches with color inks to be used, and determining the YMCK data of a target color form the original and measured data for the color patches by interpolation. However, the Konica method is accompanied with the following drawbacks;

① For one set of color inks, a series of color patches are needed. Data collection and patch preparation are highly time consuming.
② To ensure the accuracy of interpolation, the number of color patches must be large enough: in order to, for example, double the accuracy along each axis of YMCK, then one must increase the number of patches by the factor of $2^4 = 16$.
③ Since the color space for target color and that for YMCK colorants are in a non-linear relationship, the accuracy of interpolation depends on the site in the color space. In particular, the accuracy becomes poor at the boundaries between reproducible and unreproducible regions where color patch data for interpolation are inevitably scarce.

An alternative approach is represented by one based on Neugebauer equation which deals with the statistical dot overlap in color printing in a vigorous colorimetric manner. However, in the Neugebauer approach, three equations hold for tristimulus values X, Y and Z, which are insufficient for the four unknowns YMCK.

If we eliminate K, then the three unknowns Y, M and C can be solved by the Neugebauer equation but after an almost unpractically lengthy calculation. We have judged that the Neugebauer approach is the most appropriate for a faithful color reproduction by area modulation, being capable of solving the problem of black addition. Based on such judgment, we have tried to solve the various drawbacks described above accompanying the Neugebauer approach.

The present invention has been devised in view of the foregoing points and its object is to provide a color image processing method and an apparatus therefor, in which the dot area ratio of each of the Y, M, C and K inks which correctly reproduce a target color is decided by a color scanner or the like.

SUMMARY OF THE INVENTION

The principle of the present invention will be described first.

The case that the target color is reproduced on the paper by the Y, M, C, K inks, the tristimulus values X, Y, Z are appearanced by the following Neugebauer equations.

$$X = A_w X_w + A_y X_y + A_m X_m + A_c X_c + A_k X_k + A_{ym} X_{ym} + \tag{A1}$$

-continued $AycXyc + AmcXmc + AykXyk + AmkXmk + AckXck +$ $AymkXymk + AyckXyck + AmckXmck + AymcXymc +$ $AymckXymck$ $Y = AwYw + AyYy + AmYm + AcYc + AkYk + AymYym +$ $AycYyc + AmcYmc + AykYyk + AmkYmk + AckYck +$ $AymkYymk + AyckYyck + AmckYmck + AymcYymc +$ $AymckYymck$ $Z = AwZw + AyZy + AmZm + AcZc + AkZk + AymZym +$ $AycZyc + AmcZmc + AykZyk + AmkZmk + AckZck +$ $AymkZymk + AyckZyck + AmckZmck + AymcZymc +$ $AymckZymck$ Expressing these Neugebauer equations in the form of simple functional equations gives us the following:
ti $X = f_X(A_Y, A_M, A_C, A_K)$ $Y = f_Y(A_Y, A_M, A_C, A_K)$ $Z = f_Z(A_Y, A_M, A_C, A_K)$ (A1).

Figure 2:
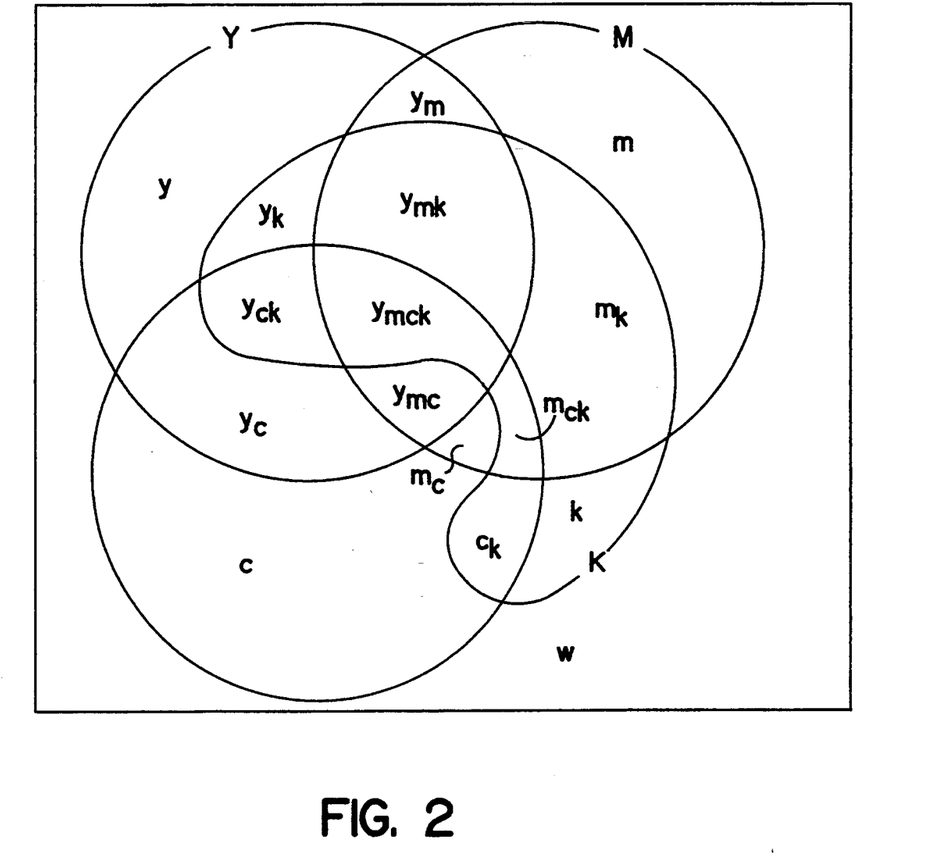
FIG. 2 is a diagram showing 16 types of color.

Here Ay, Am, Ac, ..., are area ratios of 16 types of color points [w (paper), y, m, c, k, ym, yc, mc, yk, mk, ck, ymk, yck, mck, ymc, ymck] shown in FIG. 2.

Further, Xw, Yw, Zw, Xy, Yy, Zy, Xm, Ym, Zm, Xc, Yc, Zc, ..., are the tristimulus values of each color point and are obtained by actual measurement from the paper and the inks of the colors Y, M, C, K used in printing.

The area ratios of the color points are given by the following equations based upon Demichel:

$Aw = (1 - A_Y)(1 - A_M)(1 - A_C)(1 - A_K)$ $Ay = A_Y(1 - A_M)(1 - A_C)(1 - A_K)$ $Am = (1 - A_Y)A_M(1 - A_C)(1 - A_K)$ $Ac = (1 - A_Y)(1 - A_M)A_C(1 - A_K)$ $Ak = (1 - A_Y)(1 - A_M)(1 - A_C)A_K$ $Aym = A_Y A_M(1 - A_C)(1 - A_K)$ $Ayc = A_Y(1 - A_M)A_C(1 - A_K)$ $Amc = (1 - A_Y)A_M A_C(1 - A_K)$ $Ayk = A_Y(1 - A_M)(1 - A_C)A_K$ $Amk = (1 - A_Y)A_M(1 - A_C)A_K$ $Ack = (1 - A_Y)(1 - A_M)A_C A_K$ $Aymk = A_Y A_M(1 - A_C)A_K$ $Ayck = A_Y(1 - A_M)A_C A_K$ $Amck = (1 - A_Y)A_M A_C A_K$ $Aymc = A_Y A_M A_C(1 - A_K)$ $Aymck = A_Y A_M A_C A_K$ (A2)

Substituting Eqs. (A2) into Eqs. (A1) give us $X = (L_{X1} - L_{X1}'A_K) - (L_{X2} - L_{X2}'A_K)A_Y -$ (A3)

$(L_{X3} - L_{X3}'A_K)A_M - (L_{X4} - L_{X4}'A_K)A_C +$ $(L_{X5} - L_{X5}'A_K)A_M A_Y + (L_{X6} - L_{X6}'A_K)A_Y A_C +$ $(L_{X7} - L_{X7}'A_K)A_M A_C - (L_{X8} - L_{X8}'A_K)A_Y A_M A_C$ (Y and Z take on the same form as the foregoing and therefore are deleted.)
where $L_{X1} = Xw$ $L_{X1}' = Xw - Xk$ $L_{X2} = Xw - Xy$ $L_{X2}' = Xw - Xy - Xk + Xyk$ $L_{X3} = Xw - Xm$ $L_{X3}' = Xw - Xm - Xk + Xmk$ $L_{X4} = Xw - Xc$ $L_{X4}' = Xw - Xc - Xk + Xck$ $L_{X5} = Xw - Xy - Xm + Xym$ $L_{X5}' = Xw - Xy - Xm - Xk + Xym + Xyk + Xmk - Xymk$ $L_{X6} = Xw - Xy - Xc + Xyc$ $L_{X6}' = Xw - Xy - Xc - Xk + Xyc + Xyk + Xck - Xyck$ $L_{X7} = Xw - Xm - Xc + Xmc$ $L_{X7}' = Xw - Xm - Xc - Xk + Xmc + Xmk + Xck - Xmck$ $L_{X8} = Xw - Xy - Xc + Xym + Xyc + Xmc - Xymc$ $L_{X8}' = Xw - Xy - Xm - Xc - Xk + Xym + Xyc + Xmc +$ $Xyk + Xmk + Xck - Xymk - Xyck - Xmck - Xymc + Xymck$ $L_{Y1} = Yw$ $L_{Y1}' = Yw - Yk$ $L_{Y2} = Yw - Yy$ $L_{Y2}' = Yw - Yy - Yk + Yyk$ $L_{Y3} = Yw - Ym$ $L_{Y3}' = Yw - Ym - Yk + Ymk$ $L_{Y4} = Yw - Yc$ $L_{Y4}' = Yw - Yc - Yk + Yck$ $L_{Y5} = Yw - Yy - Ym + Yym$ $L_{Y5}' = Yw - Yy - Ym - Yk + Yym + Yyk + Ymk - Yymk$ $L_{Y6} = Yw - Yy - Yc + Yyc$ $L_{Y6}' = Yw - Yy - Yc - Yk + Yyc + Yyk + Yck - Yyck$ $L_{Y7} = Yw - Ym - Yc + Ymc$ $L_{Y7}' Yw - Ym - Yc - Yk + Ymc + Ymk + Yck - Ymck$ $L_{Y8} = Yw - Yy - Ym - Yc + Yym + Yyc + Ymc - Yymc$ $L_{Y8}' = Yw - Yy - Ym - Yc - Yk + Yym + Yyc + Ymc +$ $Yyk + Ymk + Yck - Yymk - Yyck - Ymck - Yymc + Yymck$ $L_{Z1} = Zw$ $L_{Z1}' = Zw - Zk$ $L_{Z2} = Zw - Zy$ $L_{Z2}' = Zw - Zy - Zk + Zyk$ $L_{Z3} = Zw - Zm$ $L_{Z3}' = Zw - Zm - Zk + Zmk$ $L_{Z4} Zw - Zc$ $L_{Z4}' = Zw - Zc - Zk + Zck$ $L_{Z5} = Zw - Zy - Zm + Zym$ $L_{Z5}' = Zw - Zy - Zm - Zk + Zym + Zyk + Zmk - Zymk$ $L_{Z6} = Zw - Zy - Zc + Zyc$ $L_{Z6}' = Zw - Zy - Zc - Zk + Zyc + Zyk + Zck - Zyck$ $L_{Z7} = Zw - Zm - Zc + Zmc$ $L_{Z7}' = Zw - Zm - Zc - Zk + Zmc + Zmk + Zck - Zmck$ $L_{Z8} = Zw - Zy - Zm - Zc + Zym + Zyc + Zmc - Zymc$ $$L_{Z8}' = Zw - Zy - Zm - Zc - Zk + Zym + Zyc + Zmc + Zyk + Zmk + Zck - Zymk - Zyck - Zmck - Zymc + Zymck \quad (A4)$$

Hereinafter each "L" represented by the Eqs. (A4) shall be referred to as an L coefficient.

Our goal is to solve Eq (A3) as for $A_Y$, $A_M$, $A_C$ and $A_K$. However, we have only three equations as (A3) in biquadratic form with four unknowns $A_Y$, $A_M$, $A_C$ and $A_K$, we cannot determine these unknowns via an ordinary manner.

In accordance with the present invention, which is based upon the aforementioned biquadratic Neugebauer equations with four unknowns, dot area ratios that can accurately reproduce the tristimulus values X, Y, Z of a target color are decided by a method described hereinbelow.

BEST MODE FOR CARRYING OUT THE INVENTION

First, if the Neugebauer equation given by Eq. (A3) is partially differentiated with regard to $A_Y$, $A_M$, $A_C$ and we write $mX_1$, $mX_2$, $mX_3$, $mY_1$, $mY_2$, $mY_3$, $mZ_1$, $mZ_2$, $mZ_3$ for these partial derivatives, then we have the following:

$$mX_1 = \frac{\partial X}{\partial A_Y} = -(L_{X2} - L_{X2}'A_K) + (L_{X5} - L_{X5}'A_K)A_M + \quad (A5)$$

$$(L_{X6} - L_{X6}'A_K)A_C + (L_{X8} - L_{X8}'A_K)A_M A_C$$

$$mX_2 = \frac{\partial X}{\partial A_M} = -(L_{X3} - L_{X3}'A_K) + (L_{X5} - L_{X5}'A_K)A_Y +$$

$$(L_{X7} - L_{X7}'A_K)A_C + (L_{X8} - L_{X8}'A_K)A_Y A_C$$

$$mX_3 = \frac{\partial X}{\partial A_C} = -(L_{X4} - L_{X4}'A_K) + (L_{X6} - L_{X6}'A_K)A_Y +$$

$$(L_{X7} - L_{X7}'A_K)A_M + (L_{X8} - L_{X8}'A_K)A_Y A_M$$

(The equations take on similar form for Y, Z)

Accordingly, the amounts of deviation $\partial X$, $\partial Y$, $\partial Z$ of the tristimulus values X, Y, Z are as follows, from Eqs. (5):

$$\begin{bmatrix} \partial X \\ \partial Y \\ \partial Z \end{bmatrix} = \begin{bmatrix} mX_1 & mX_2 & mX_3 \\ mY_1 & mY_2 & mY_3 \\ mZ_1 & mZ_2 & mZ_3 \end{bmatrix} \begin{bmatrix} \partial A_Y \\ \partial A_M \\ \partial A_C \end{bmatrix} \quad (A6)$$

The amounts of deviation $\partial A_Y$, $\partial A_M$, $\partial A_C$ of the dot area ratios $A_Y$, $A_M$, $A_C$ can be expressed as follows:

$$\begin{bmatrix} \partial A_Y \\ \partial A_M \\ \partial A_C \end{bmatrix} = \begin{bmatrix} mX_1 & mX_2 & mX_3 \\ mY_1 & mY_2 & mY_3 \\ mZ_1 & mZ_2 & mZ_3 \end{bmatrix}^{-1} \begin{bmatrix} \partial X \\ \partial Y \\ \partial Z \end{bmatrix} \quad (A7)$$

A first embodiment of a color image processing method according to the present invention will be described first.

Figure 1:
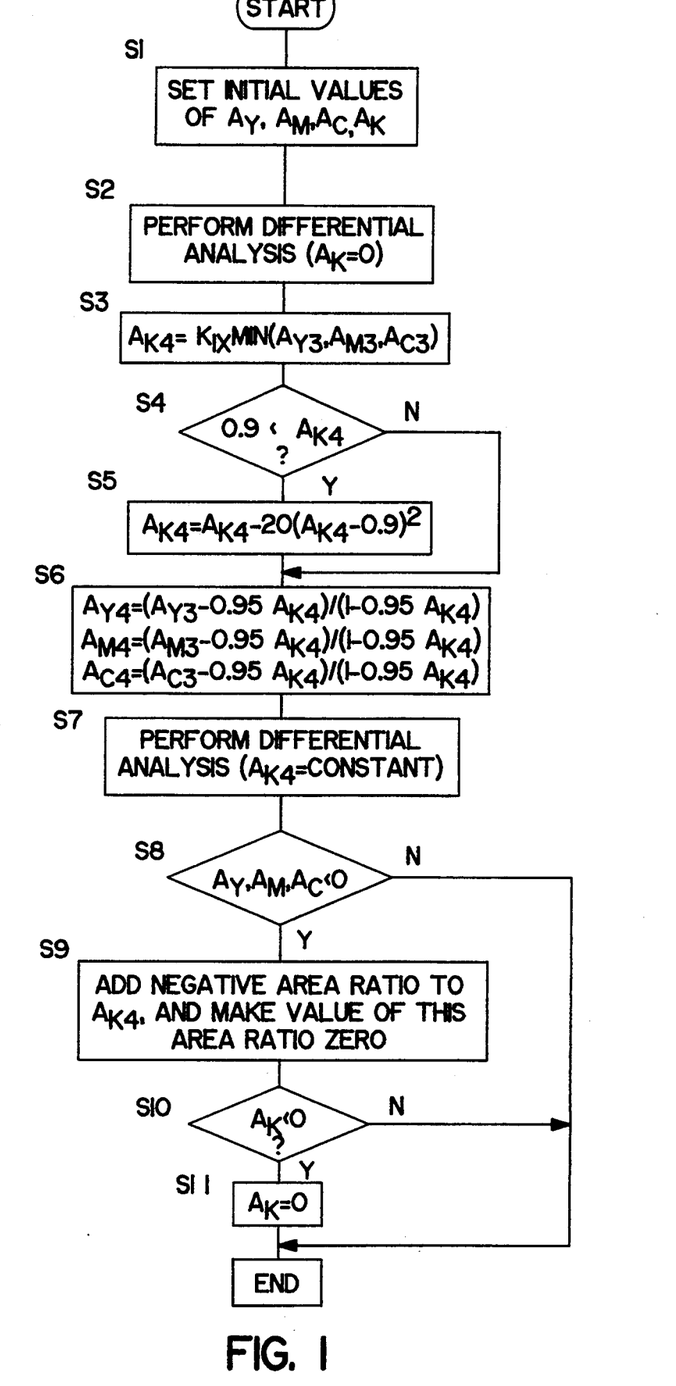
FIGS. 1 and 3 are processing flowcharts illustrating the processing procedure of each embodiment of the present invention.

FIG. 1 is a processing flowchart showing the processing procedure of this embodiment.

First, dot area ratios are obtained which prevail when a target color is reproduced by the three colors Y, M, C, without inclusion of the color black. This method is similar to the conventional UCR method in that K is set tentatively at 0 to first obtain Y, M and C.

In obtaining dot area ratios, first arbitrary initial dot area ratios are given. In this embodiment, initial dot area ratios $A_{Y0}$, $A_{M0}$, $A_{C0}$ of $A_Y$, $A_M$, $A_C$ are set in the following manner as approximations given from a complementary color relationship upon taking into consideration the distributions $\bar{x}(\lambda)$, $\bar{y}(\lambda)$, $\bar{z}(\lambda)$ of an X, Y, Z color matching function (step S1 in FIG. 1:

$A_{Y0} = 1 - Z$ $A_{M0} = 1 - Y$ $A_{C0} = 1 - X$ $$(A_{K0}=0) \tag{A8}$$

In solving an equation numerically, how to set the initial value strongly influences the efficiency of calculation; the closer the initial value to the final solution, the shorter the calculation time becomes. In the present case, the unknowns, i.e., dot area ratios $A_Y$, $A_M$ and $A_C$ are expected to take values between 0 and 1 for most cases. Then, from stochastic viewpoint, the middle point 0.5 might be chosen as the initial value which has actually been practiced in the art. However, by taking into account the physical meaning of and relations between the variables involved, we have adopted the approach expressed by equation (A8) as a better method.

Letting $X_0$, $Y_0$, $Z_0$ represent the tristimulus values of the color calculated by the initial dot area ratios $A_{Y0}$, $A_{M0}$, $A_{C0}$, ($A_{K0}$), the differences between these values and the target color are expressed in the following form:

$$\partial X = X_0 - X$$
$$\partial Y = Y_0 - Y$$
$$\partial Z = Z_0 - Z \tag{A9}$$

It should be noted that the tristimulus values $X_0$, $Y_0$, $Z_0$ of the color reproduced will be obtained if the initial dot area ratios $A_{Y0}$, $A_{M0}$, $A_{C0}$, $A_{K0}$ are inserted into the Neugebauer equation (A3).

Next, if the values found by substituting the values obtained from Eqs. (A8) into Eqs. (A5), as well as the values obtained from Eqs. (A9), are substituted into Eq. (A7), then the amounts of deviation $\partial A_Y$, $\partial A_M$, $\partial A_C$ of the dot area ratios can be obtained.

Accordingly, the dot area ratios of Y, M, C made to converge to the target color are found by the following (step S2 in FIG. 1):

$$A_{Y3} = A_{Y0} - \partial A_Y$$
$$A_{M3} = A_{M0} - \partial A_M$$
$$A_{C3} = A_{C0} - \partial A_C \tag{A10}$$

In the present invention, obtaining dot area ratio by this technique using differentiation as described above is referred to as "differential correction".

The dot area rations $A_{Y3}$, $A_{M3}$, $A_{C3}$ are thus obtained. However, since these dot areas $A_{Y3}$, $A_{M3}$, $A_{C3}$ are obtained as dot area ratios which prevail when a target color is reproduced by the three colors Y, M, C, a dot area ratio which reproduces a target color by the four colors Y, M, C, K, which include the color black, is found next.

First, the dot area ratio of K is taken to be as follows (step S3 in FIG. 1):

$$A_{K4} = K_1 \times \mathrm{Min}(A_{Y3}, A_{M3}, A_{C3}) \tag{A11}$$

$K_1$: black ratio

More specifically, the product obtained by multiplying the minimum value of $A_{Y3}$, $A_{M3}$, $A_{C3}$ by the black ratio $K_1$ is taken as the dot area ratio $A_{K4}$ of K.

In a case where $A_{K4}$ exceeds 0.9 (step S4 in FIG. 1), the computation $$A_{K4} = A_{K4} - 0.2(A_{K4} - 0.9)^2 \tag{A12}$$

is performed to reduce slightly the dot area ratio of black (step S5 in FIG. 1). The coefficient in Eq. (A12) is not limited to 20.

The constant 0.2 has been determined experimentally. It should be noted that, in the conventional UCR method, the color difference between the black formed by the superimposition of the Y, M and C inks and that with the K ink has been totally ignored, thus obtaining the final dot area ratios by subtracting $A_{K4}$ determined by eq. (A11) from each of $A_{Y3}$, $A_{M3}$ and $A_{C3}$.

It is well known that the conventional UCR method cannot reproduce colors faithfully enough, and we have improved the calculation method by adding the step of iteratively solving the Neugebauer equation by use of the value $A_{K4}$ obtained by eq. (A11). However, according to our finding that, towards the darkest regions, such an iteration does not work well due to excessive addition of K, a new term has been added in order to slightly reduce the value of K by use of an experimentally determined constant.

When $A_{K4}$ has been obtained in this manner, the initial dot area ratios for the four colors Y, M, C, K are made as follows (step S6 in FIG. 1):

$$A_{Y4} = (A_{Y3} - 0.95A_{K4})/(1 - 0.95A_{K4})$$
$$A_{M4} = (A_{M3} - 0.95A_{K4})/(1 - 0.95A_{K4})$$
$$A_{C4} = (A_{C3} - 0.95A_{K4})/(1 - 0.95A_{K4})$$
$$A_{K4} \tag{A13}$$

and differential correction is carried out (step S7 in FIG. 1).

During the differential correction, $A_{K4}$ is made constant. Eq. (A13) is based on Sayanagi's concept of Gray Compact Replacement (GCR) presented at TAGA (Technical Association of Graphic Arts) in 1986. We have confirmed that this equation can compensate for the drawbacks of the conventional UCR method, well explaining the empirically optimized results about black addition. Further reference can be made to TAGA Proceedings, 87, pp. 711–724 (1987) as for the GCR method. Eq. (A13) is modified from the equation for the GCR method cited above in that it involves a constant of 0.95. This constant has been introduced to prevent $A_{Y4}$ from becoming 0 when, for example, $A_{Y3} = A_{K4}$. This constant can take any value between 0.9 and 1.0. The same will be true hereinafter.

New dot area ratios $A_{Y4}'$, $A_{M4}'$, $A_{C4}'$ are determined by $$A_{Y4}' = A_{Y4} - \partial A_Y$$
$$A_{M4}' = A_{M4} - \partial A_M$$
$$A_{C4}' = A_{C4} - \partial A_C$$

By repeating this differential correction a number of times, the color reproduction realized by the dot area ratios obtained approximates the target color, and therefore it is permissible to subsequently perform differential correction a number of times. The initial dot area ratios at such time use the dot area ratios found by the immediately preceding differential correction.

Next, when the dot area ratios $A_{Y4}'$, $A_{M4}'$, $A_{C4}'$ thus obtained include a negative value (step S8 in FIG. 1), the negative value among the dot area ratios $A_{Y4}'$, $A_{M4}'$, $A_{C4}'$ is added to $A_{K4}$ and the area which is negative is made zero (step S9 in FIG. 1).

If $A_{K4}$ becomes negative in this processing (step S10 in FIG. 1), $A_{K4}$ also is made zero (step S11 in FIG. 1).

The dot area ratios of Y, M, C, K thus obtained are dot area ratios which correctly reproduce the target color.

In the first embodiment described above, the amount of black can be adjusted by changing the value of the black ratio K1, as illustrated also in Eq. (A11).

A second embodiment of a color image processing method according to the present invention will now be described.

Figure 3:
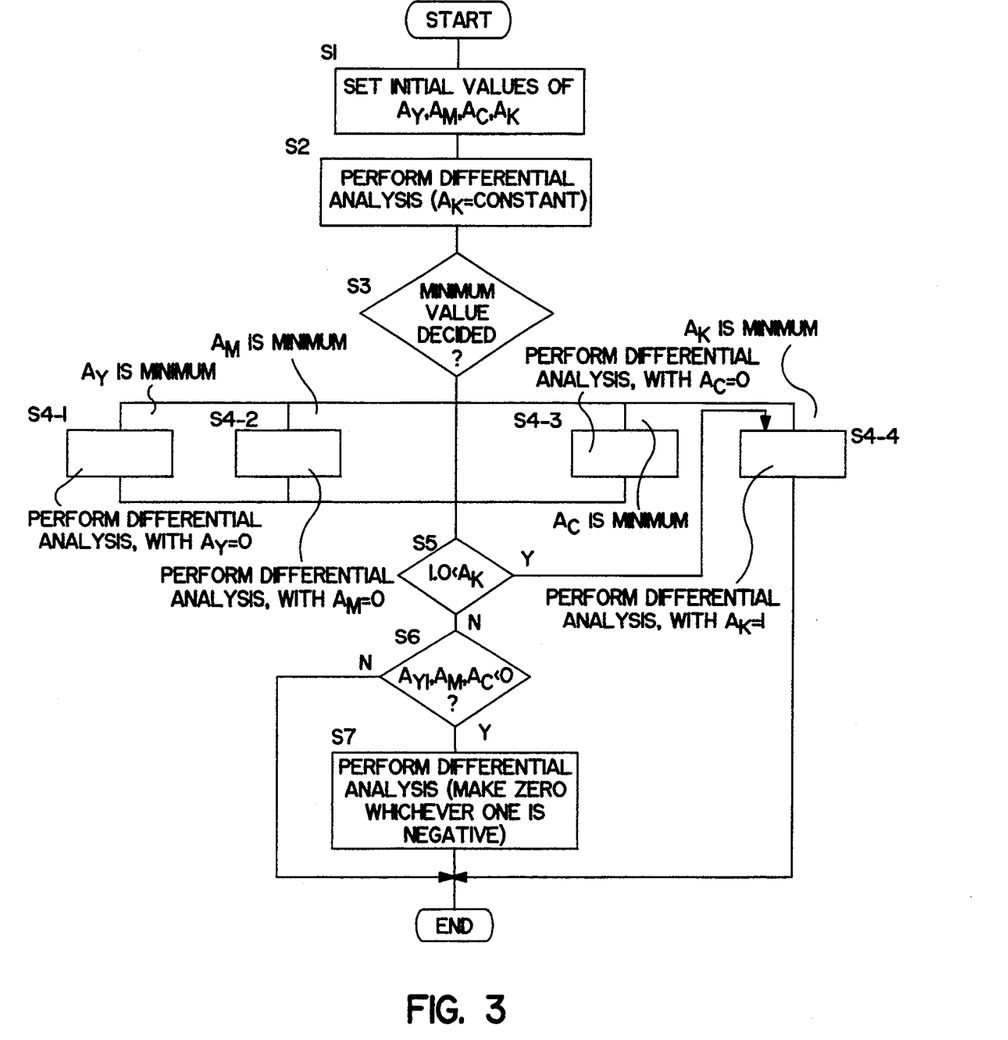

FIG. 3 is a processing flowchart showing the processing procedure of this embodiment.

In this embodiment, initial dot area ratios $A_{Y0}$, $A_{M0}$, $A_{C0}$ and $A_{K0}$ of $A_Y$, $A_M$, $A_C$ and $A_K$ are set in the following manner based upon GCR (Gray component replacement) equations (step S1 in FIG. 3:

$$A_{Y0} = \{(1-Z) - 0.95 A_{K0}\}/(1 - 0.95 A_{K0})$$

$$A_{M0} = \{(1-Y) - 0.95 A_{K0}\}/(1 - 0.95 A_{K0})$$

$$A_{C0} = \{(1-X) - 0.95 A_{K0}\}/(1 - 0.95 A_{K0})$$

$$A_{K0} = \text{Min}(1-X, 1-Y, 1-Z) \quad (A14)$$

Letting $X_0$, $Y_0$, $Z_0$ represent the tristimulus values of the color expressed by the initial dot area ratios $A_{Y0}$, $A_{M0}$, $A_{C0}$, $A_{K0}$, the differences between these values and the target color are expressed in the following form:

$$\partial X = X_0 - X$$

$$\partial Y = Y_0 - Y$$

$$\partial Z = Z_0 - Z \quad (A15)$$

Next, differential correction is performed using $A_K$ as a constant, the dot area ratios $A_Y$, $A_M$, $A_C$ are found (step S2 in FIG. 3).

More specifically, if $A_K$ is fixed at $A_{K0}$, the values found by substituting the values computed in accordance with Eqs. (A14) into Eqs. (A5), as well as the values found from Eqs. (A15), are substituted into Eq. (A7), then $\partial A_Y$, $\partial A_M$, $\partial A_C$ can be obtained.

Accordingly, differential analysis is performed and the dot area ratios of Y, M, C, K made to converge to the target color are found by the following:

$$A_{Y3} = A_{Y0} - \partial A_Y$$

$$A_{M3} = A_{M0} - \partial A_M$$

$$A_{C3} = A_{C0} - \partial A_C$$

$$A_{K3} = A_{K0} \quad (A16)$$

Further, the above-described differential correction is performed again using $A_{Y3}$, $A_{M3}$, $A_{C3}$, $A_{K3}$ in Eqs. (A16), so that more precise values of $A_{Y3}$, $A_{M3}$, $A_{C3}$, $A_{K3}$ can be obtained.

Next, the minimum value among the $A_{Y3}$, $A_{M3}$, $A_{C3}$, $A_{K3}$ obtained is detected (step S3 in FIG. 3).

When any of $A_{Y3}$, $A_{M3}$, $A_{C3}$ is minimum, this dot area ratio is taken as being zero and differential correction is repeated a suitable number of times (three, for example) with the other two and $A_{K3}$ serving as initial dot area ratios.

When $A_{K3}$ is minimum, however, differential correction is repeated a suitable number of times (step S4 in FIG. 3), with $A_{K3} = 1$ and $A_{Y3}$, $A_{M3}$, $A_{C3}$ serving as initial dot area ratios. The details are described hereinbelow.

① When $A_{Y3}$ is minimum (step S4-1 in FIG. 3)

Differential analysis is repeated a suitable number of times, with $A_{Y3} = 0$ and $A_{M3}$, $A_{C3}$, $A_{K3}$ serving as initial dot area ratios, and the dot area ratios of $A_M$, $A_C$, $A_K$ are found.

Though not shown in Eqs. (A5), if the Neugebauer equation given by Eq. (A3) is partially differentiated with regard to AK and we write $mX_4$, $mY_4$, $mZ_4$ for these partial derivatives, then we have the following:

$$mX_4 = \frac{\partial X}{\partial A_K} = -L_{X1}' + L_{X2}'A_Y + L_{X3}'A_M + L_{X4}'A_C - \quad (A17)$$

$$L_{X5}'A_YA_M - L_{X6}'A_YA_C - L_{X7}'A_MA_C + L_{X8}'A_YA_MA_CA_K$$

$$mY_4 = \frac{\partial Y}{\partial A_K} = -L_{Y1}' + L_{Y2}'A_Y + L_{Y3}'A_M + L_{Y4}'A_C -$$

$$L_{Y5}'A_YA_M - L_{Y6}'A_YA_C - L_{Y7}'A_MA_C + L_{Y8}'A_YA_MA_CA_K$$

$$mZ_4 = \frac{\partial Z}{\partial A_K} = -L_{Z1}' + L_{Z2}'A_Y + L_{Z3}'A_M + L_{Z4}'A_C -$$

$$L_{Z5}'A_YA_M - L_{Z6}'A_YA_C - L_{Z7}'A_MA_C + L_{Z8}'A_YA_MA_CA_K$$

Accordingly, if Eq. (A5) and Eq. (A17) are expressed in the form of matrices with regard to M,C,K, we have $$\begin{bmatrix} \partial X \\ \partial Y \\ \partial Z \end{bmatrix} = \begin{bmatrix} mX_2 & mX_3 & mX_4 \\ mY_2 & mY_3 & mY_4 \\ mZ_2 & mZ_3 & mZ_4 \end{bmatrix} = \begin{bmatrix} \partial A_M \\ \partial A_C \\ \partial A_K \end{bmatrix} \quad (A18)$$

From this we have $$\begin{bmatrix} \partial A_M \\ \partial A_C \\ \partial A_K \end{bmatrix} = \begin{bmatrix} mX_2 & mX_3 & mX_4 \\ mY_2 & mY_3 & mY_4 \\ mZ_2 & mZ_3 & mZ_4 \end{bmatrix}^{-1} \begin{bmatrix} \partial X \\ \partial Y \\ \partial Z \end{bmatrix} \quad (A19)$$

If predetermined values are inserted into this reverse matrix, then $\partial A_M$, $\partial A_C$, $\partial A_K$ can be obtained and the dot area ratios of M, C, K are found from these. This differential correction is repeated a suitable number of times.

② When $A_{M3}$ is minimum (step S4-2 in FIG. 3)

Differential correction is repeated a suitable number of times, with $A_{M3} = 0$ and $A_{Y3}$, $A_{C3}$, $A_{K3}$ serving as initial dot area ratios, and the dot area ratios of $A_Y$, $A_C$, $A_K$ are found.

If Eq. (A5) and Eq. (A17) are expressed in the form of matrices with regard to Y,C,K, we have $$\begin{bmatrix} \partial X \\ \partial Y \\ \partial Z \end{bmatrix} = \begin{bmatrix} mX_1 & mX_3 & mX_4 \\ mY_1 & mY_3 & mY_4 \\ mZ_1 & mZ_3 & mZ_4 \end{bmatrix} = \begin{bmatrix} \partial A_Y \\ \partial A_C \\ \partial A_K \end{bmatrix} \quad (A20)$$

From this we have $$\begin{bmatrix} \partial A_Y \\ \partial A_C \\ \partial A_K \end{bmatrix} = \begin{bmatrix} mX_1 & mX_3 & mX_4 \\ mY_1 & mY_3 & mY_4 \\ mZ_1 & mZ_3 & mZ_4 \end{bmatrix}^{-1} \begin{bmatrix} \partial X \\ \partial Y \\ \partial Z \end{bmatrix} \quad (A21)$$

If predetermined values are inserted into this reverse matrix, then $\partial A_Y$, $\partial A_C$, $\partial A_K$ can be obtained and the dot area ratios of Y, C, K are found from these. This differential correction is repeated a suitable number of times.

③ When $A_{C3}$ is minimum (step S4-3 in FIG. 3)

Differential correction is repeated a suitable number of times, with $A_{C3}=0$ and $A_{Y3}$, $A_{M3}$, $A_{K3}$ serving as initial dot area ratios, and the dot area ratios of $A_Y$, $A_M$, $A_K$ are found.

If Eq. (A5) and Eq. (A17) are expressed in the form of matrices with regard to Y,M,K, we have $$\begin{bmatrix} \partial X \\ \partial Y \\ \partial Z \end{bmatrix} = \begin{bmatrix} mX_1 & mX_2 & mX_4 \\ mY_1 & mY_2 & mY_4 \\ mZ_1 & mZ_2 & mZ_4 \end{bmatrix} = \begin{bmatrix} \partial A_Y \\ \partial A_M \\ \partial A_K \end{bmatrix} \quad (A22)$$

From this we have $$\begin{bmatrix} \partial A_Y \\ \partial A_M \\ \partial A_K \end{bmatrix} = \begin{bmatrix} mX_1 & mX_2 & mX_4 \\ mY_1 & mY_2 & mY_4 \\ mZ_1 & mZ_2 & mZ_4 \end{bmatrix}^{-1} \begin{bmatrix} \partial X \\ \partial Y \\ \partial Z \end{bmatrix} \quad (A23)$$

If predetermined values are inserted into this D reverse matrix, then $\partial A_Y$, $\partial A_M$, $\partial A_K$ can be obtained and the dot area ratios of Y, M, K are found from these. This differential correction is repeated a suitable number of times.

④ When $A_{K3}$ is minimum (step S4-3 in FIG. 3)

Differential correction is repeated a suitable number of times, with $A_{K3}=1$ and $A_{Y3}$, $A_{M3}$, $A_{M3}$ serving as initial dot area ratios, and the dot area ratios of $A_Y$, $A_M$, $A_C$ are found.

If predetermined values are inserted into the reverse matrix of Eq. (A7), then $\partial A_Y$, $\partial A_M$, $\partial A_C$ can be obtained and the dot area ratios of Y, M, C are found from these.

If the dot area ratio $A_K$ of black satisfies the relation $$1.0 < A_K$$

(step S5 in FIG. 1) as a result of the processing of any one of the steps ① through ③ mentioned above, then $A_Y$, $A_M$, $A_C$ are subjected to further differential correction, with $A_K=1$. This differential analysis is repeated a suitable number of times.

If a negative area ratio is produced (step S6 in FIG. 3) as a result of the processing of any one of the steps ① through ③ mentioned above, then this area ratio is made zero and the remaining three colors are subjected to further differential analysis the necessary number of times (step S7 in FIG. 3).

The dot area ratios of Y, M, C, K thus obtained are those which correctly reproduce the target color.

When a certain target color is reproduced in the second embodiment described above, the dot area ratios of Y, M, C, K are decided in such a manner that black is introduced to the maximum extent. In his book, "Principles of Color Reproduction,, (John Wiley & Sons, Inc., New York, London, Sydney) published in 1967, Yule described the concept of maximum black addition, in which, by making one of the three dot area ratios $A_Y$, $A_M$ and $A_C$ equal to 0, one reproduces colors with the remaining two colors plus black. In spite of such an early publication of the concept, its implementation was quite difficult by the reasons already explained heretofore. U.S. Pat. No. 5,121,196 to Konica avoided the difficulties by the use of color patches but still with some drawbacks described previously.

The method of the present invention starts with the biquadratic Neugebauer equation to achieve the maximum black addition, comprising, as a first step determining which one be set 0 of $A_Y$, $A_M$ and $A_C$ by the first differential correction (S2 in FIG. 3), and then obtaining the dot area ratios of the remaining two colors and K by the second differential correction. The method is characterized by a faithful color reproduction in the darkest region where all of the four inks are needed (S4-4 in FIG. 3), and color reproduction with an improved degree of approximation even in the non-reproducible (color space) regions (S7 in FIG. 3).

Thus, two embodiments are described above. Following the processing of each embodiment, it is possible to calculate the color difference (e.g., $\Delta E$ in a CIELAB color system) between a reproduced color obtained by the dot area ratios decided and the target color, and perform differential correction again the required number of times if this color difference exceeds an arbitrarily set value, thereby deciding dot area ratios anew.

The dot area ratios decided by this processing will reproduce the target color with greater accuracy.

An embodiment of the color image processing apparatus of the present invention will now be described.

Figure 4:
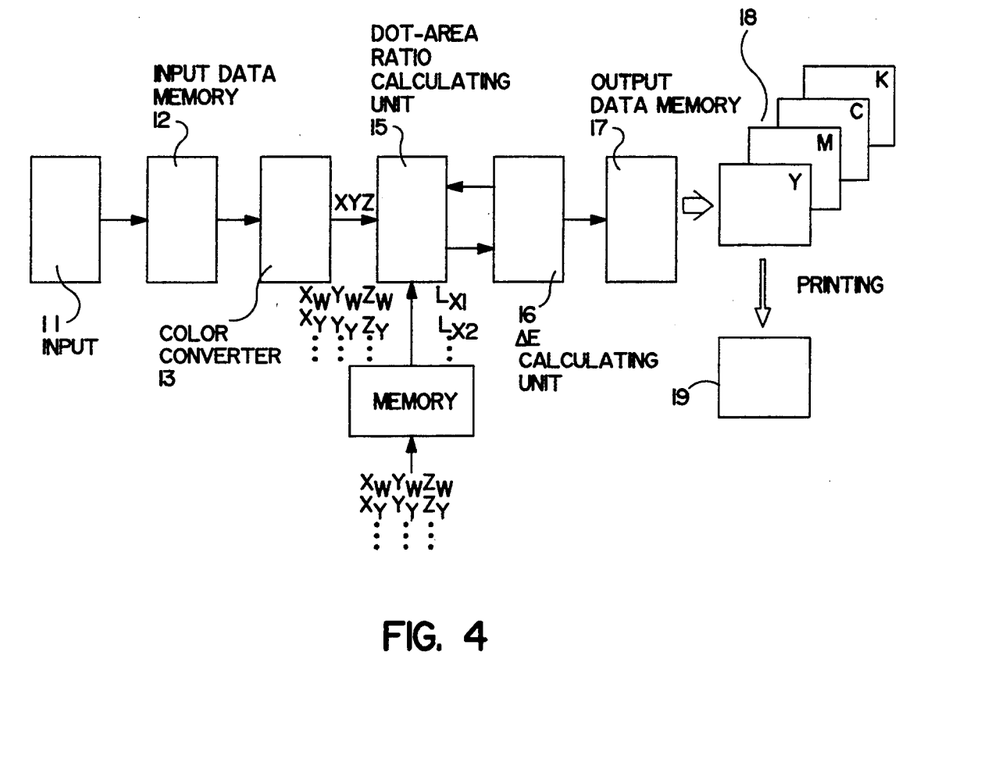
FIG. 4 is a block diagram showing an embodiment of a color image processing apparatus according to the present invention.

FIG. 4 is a block diagram showing an embodiment of the color image processing apparatus of the invention, in which dot area ratios are decided from a color signal obtained as by causing a scanner to scan an original.

Numeral 11 denotes an input unit for inputting a color signal of an original by subjecting the original to color-separation scanning using a scanner, or for effecting a conversion into a color signal using another device and inputting the resulting data, which is stored on a magnetic tape or the like.

Numeral 12 denotes an input data memory for storing the color-signal data entered from the input unit 11.

Numeral 13 denotes a color converter which, upon receiving an input of a color signal in a color system different from the XYZ color system, such as an RGB color system or CIELAB color system, converts the color signal from these color systems to the XYZ color system.

Numeral 14 designates a memory which stores the tristimulus values $X_W$, $Y_W$, $Z_W$, $X_Y$, $Y_Y$, $Z_Y$, ..., of the 16 types of colors, actually measured using the Y, M, C, K inks and paper employed in printing. Alternatively, the values of each of the L coefficients expressed by the Eqs. (A4) are calculated from these stimulus values $X_W$, $Y_W$, $Z_W$, $X_Y$, $Y_Y$, $Z_Y$, ..., and the values of these coefficients are stored in this memory.

Numeral 15 represents a unit for calculating dot area ratio. This unit calculates dot area ratios, in accordance with the methods of the above-described embodiments, based upon the tristimulus values X, Y, Z of the target color and either the tristimulus values of each color point or the values of each of the L coefficients stored in the memory 14.

Numeral 16 denotes a color-difference calculating unit for calculating the color difference ΔE between the target color and the reproduced color obtained by the dot area ratios calculated by the calculating unit 15. When the color difference ΔE exceeds a predetermined value, the color-difference calculating unit 16 provides the calculating unit 15 with a command calling for recalculation of the dot area ratios.

Numeral 17 designates an output data memory for storing the dot area ratios decided.

The color image processing apparatus thus constructed is used to decide dot area ratios which reproduce a target color pixel by pixel.

In accordance with the data indicative of the dot area ratios decided by this color image processing apparatus, color plates 18 for each of the colors Y, M, C, K are fabricated, and printing is performed using these plates to enable desired printed matter 19 to be obtained.

Embodiments of the present invention have been described above. Though the aforementioned embodiments decide dot area ratios when color printing is performed, the present invention is not limited to a case in which color printing is carried out.

In addition, the number of times differential correction is performed in each of the aforementioned steps is not limited to that described above.

Industrial Applicability

As described hereinabove, the present invention decides the dot area ratios of four colors, inclusive of black, based upon the Neugebauer equations which accurately describe the actual phenomenon wherein color printing using inks of the four colors Y, M, C, K is reproduced by a mean additive color mixture employing 16 types of color points. As a result, excellent color reproduction can be achieved.

What is claimed is:

1. A color image reproduction method which decides dot area ratios for reproducing a target color by means of the following steps using inks of the four colors Y, M, C, K:
   (1) a step of obtaining dot area ratios $A_{Y3}$, $A_{M3}$, $A_{C3}$ from biquadratic Neugebauer equations with four unknowns, in which an initial dot area ratio $A_{K0}$ of K is taken as being a constant $$A_{K0} = \text{Min}(1-X, 1-Y, 1-Z)$$

and initial dot area ratios $A_{Y0}$, $A_{M0}$, $A_{C0}$ of the three colors Y, M, C are taken respectively as being $$A_{Y0} = \{(1-Z) - PA_{K0}\}/(1-pA_{K0})$$

$$A_{M0} = \{(1-Y) - PA_{K0}\}/(1-pA_{K0})$$

$$A_{C0} = \{(1-X) - PA_{K0}\}/(1-pA_{K0})$$

where P is a constant ranging from 0.9 to 1.0;
   (2) a step of obtaining a dot area ratio from biquadratic Neugebauer equations with four unknowns in which, when any one of $A_{Y3}$, $A_{M3}$, $A_{C3}$ among dot area ratios $A_{Y3}$, $A_{M3}$, $A_{C3}$, $A_{K3}(=A_{K0})$ is minimum, the minimum dot area ratio is taken as being zero and the dot area ratios of the other two colors and of K are taken as being variables, and when $A_{K3}$ is minimum, $$A_{K3} = 1.0$$

is taken as holding and the dot area ratios of the three colors Y, M, C are taken as being variables;
   (3) when a dot area ratio of K exceeds 1.0, a step of obtaining a dot area ratio from biquadratic Neugebauer equations with four unknowns, in which $$A_K = 1.0$$

is taken as holding;
   (4) when any of the dot area ratios of the three colors Y, M, C becomes negative, a step of obtaining a dot area ratio from biquadratic Neugebauer equations with four unknowns, in which this negative dot area ratio is taken as being zero and the area dot ratios of the other two colors and of K are taken as being variables; and
   (5) reproducing the target color from said dot area ratios of the four colors Y, M, C, K.

2. A color image reproduction method which decides dot area ratios for reproducing a target color by means of the following steps using inks of the four colors Y, M, C, K:
   (1) a step of obtaining dot area ratios $A_{Y3}$, $A_{M3}$, $A_{C3}$ from biquadratic Neugebauer equations with four unknowns, in which an initial dot area ratio $A_{K0}$ of K is taken as being a constant $$A_{K0} = \text{Min}(1-X, 1-Y, 1-Z)$$

and initial dot area ratios $A_{Y0}$, $A_{M0}$, $A_{C0}$ of the three colors Y, M, C are taken respectively as being $$A_{Y0} = \{(1-Z) - PA_{K0}\}/(1-PA_{K0})$$

$$A_{M0} = \{(1-Y) - PA_{K0}\}/(1-PA_{K0})$$

$$A_{C0} = \{(1-x) - PA_{K0}\}/(1-PA_{K0})$$

where P is constant ranging from 0.9 to 1.0;
   (2) a step of obtaining a dot area ratio from biquadratic Neugebauer equations with four unknowns in which, when any one of $A_{Y3}$, $A_{M3}$, $A_{C3}$ among dot area ratios $A_{Y3}$, $A_{M3}$, $A_{C3}$, $A_{K3}$ ($=A_{K0}$) is minimum, the minimum dot area ratio is taken as being zero and the dot area ratios of the other two colors and of K are taken as being variables, and when $A_{K3}$ is minimum, $$A_{K3} = 1.0$$

is taken as holding and the dot area ratios of the three colors Y, M, C are taken as being variables;
   (3) when a dot area ratio of K exceeds 1.0, a step of obtaining a dot area ratio from biquadratic Neugebauer equations with four unknowns, in which $$A_K = 1.0$$

is taken as holding;
   (4) when any of the dot area ratios of the three colors Y, M, C becomes negative, a step of obtaining a dot area ratio from biquadratic Neugebauer equations with four unknowns, in which this negative dot area ratio is taken as being zero and the area dot ratios of the other two colors and of K are taken as being variables; and (5) reproducing the target color from said dot area ratios of the four colors L M, C, K;

further said color image reproduction method being characterized in that dot area ratios are obtained from said biquadratic Neugebauer equations with four unknowns by the following steps:

(1) a step of obtaining initial dot area ratios of the four colors Y, M, C, K based on tristimulus values X, Y, Z of a target color to be reproduced;

(2) a step of obtaining amounts of deviation from dot area ratios found from the initial dot area ratios and the Neugebauer equations based upon the following reversed matrix:

$$\begin{bmatrix} \partial A_i \\ \partial A_j \\ \partial A_k \end{bmatrix} = \begin{bmatrix} mX_i & mX_j & mX_k \\ mY_i & mY_j & mY_k \\ mZ_i & mZ_j & mZ_k \end{bmatrix}^{-1} \begin{bmatrix} \partial X \\ \partial Y \\ \partial Z \end{bmatrix}$$

derived from biquadratic Neugebauer equations with four unknowns, namely $X = f_X(A_Y, A_M, A_C, A_K)$ $Y = f_Y(A_Y, A_M, A_C, A_K)$ $Z = f_Z(A_Y, A_M, A_C, A_K)$ in which any one of $A_Y$, $A_M$, $A_C$, $A_K$ is taken as being a constant and the other three are taken as being variables, where (i) $mX_i$, $mX_j$, $mX_k$, $mY_i$, $mY_j$, $mY_k$, $mZ_i$, $mZ_j$, $mZ_k$ are obtained by partially differentiating Neugebauer equations at the dot area ratio of any of $A_Y$, $A_M$, $A_C$, $A_K$;

(ii) $\partial X$, $\partial Y$, $\partial Z$ are amounts of deviation between tristimulus values of a color reproduced at the initial dot area ratios and tristimulus values of a target color to be reproduced; and (iii) $\partial A_i$, $\partial A_j$, $\partial A_k$ are amounts of deviation from dot area ratios obtained from the initial dot area ratios and the Neugebauer equations;

(3) a step of obtaining dot area ratios from the obtained amounts of deviation of the dot area ratios and the initial dot area ratios; and (4) reproducing the target color from said obtained dot area ratios.

3. A color image processing apparatus for deciding dot area ratios from a color signal produced as by color-separation scanning an original using a scanner, comprising:

a memory for storing values of tristimulus values $X_W$, $Y_W$, $Z_W$, $X_Y$, $Y_Y$, $Z_Y$, ..., of 16 types of color points of inks of the four colors Y, M, C, K and paper, or values of L coefficients calculated using said tristimulus values; and a dot area ratio calculating unit for calculating dot area ratios of the four colors Y, M, C, K, inclusive of black, from tristimulus values X, Y, Z of a target color to be reproduced and either the tristimulus values of each of the color points or the values of the L coefficients stored in said memory, said dot-area ratio calculating unit comprising:

(1) a means for obtaining dot area ratios $A_{Y3}$, $A_{M3}$, $A_{C3}$ from biquadratic Neugebauer equations with four unknowns, in which initial dot area ratios of the three colors Y, M, C are taken respectively as being $A_{Y0}$, $A_{M0}$, $A_{C0}$ and an initial dot area ratio $A_{K0}$ of black (K) is taken as being a constant $A_{K0} = 0$ (2) a means for obtaining an initial dot area ratio $A_{K4}$ of K by multiplying a minimum value of the obtained dot area ratios $A_{Y3}$, $A_{M3}$, $A_{C3}$ by a black ratio $K_1$;

(3) a means for obtaining new dot area ratios $A_{Y4}'$, $A_{M4}'$, $A_{C4}'$ from biquadratic Neugebauer equations with four unknowns, in which initial dot area ratios are taken respectively as being $A_{Y4} = (A_{Y3} - PA_{K4})/(1 - PA_{K4})$ $A_{M4} = (A_{M3} - PA_{K4})/(1 - PA_{K4})$ $A_{C4} = (A_{C3} - PA_{K4})/(1 - PA_{K4})$ where P is a constant range from 0.9 to 1.0, and $A_{K4}$ is taken as being a constant;

(4) a means for determining if any of the new dot area ratios $A_{Y4}'$, $A_{M4}'$, $A_{C4}'$ becomes negative and for making this negative dot area ratio zero and adding this dot area ratio to $A_{K4}$; and (5) a means for determining when $A_{K4}$ becomes negative and for making $A_{K4}$ zero.

4. A color image reproduction method which reproduces a target color by using inks of the four colors Y, M, C, K, including the steps of:

taking cubic Neugebauer equations with three unknowns, from biquadratic Neugebauer equations with four unknowns, in which initial dot area ratios of the four colors Y, M, C, K are taken respectively as being $A_{Y0}$, $A_{M0}$, $A_{C0}$, $A_{K0}$ and the initial dot area ratio $A_{K0}$ of black (K) is taken as being a constant $A_{K0} = 0$, obtaining dot area ratios of $A_{Y3}$, $A_{M3}$, $A_{C3}$ from said cubic Neugebauer equations with three unknowns, and obtaining a dot area ratio $A_{K4}$ of K by multiplying a minimum value of the obtained dot area ratios of $A_{Y3}$, $A_{M3}$, $A_{C3}$ by a black ratio $K_1$, further comprising the following steps:

(1) a step of obtaining new dot area ratios $A_{Y4}'$, $A_{M4}'$, $A_{C4}'$ from biquadratic Neugebauer equations with four unknowns, in which initial dot area ratios are taken respectively as being $A_{Y4} = (A_{Y3} - PA_{K4})/(1 - PA_{K4})$ $A_{M4} = (A_{M3} - PA_{K4})/(1 - PA_{K4})$ $A_{C4} = (A_{C3} - PA_{K4})/(1 - PA_{K4})$ where P is a constant ranging from 0.9 to 1.0, and $A_{K4}$ is taken as being a constant;

whereby reproduced color is realized in a color reproducing area of three colors Y, M, C;

(2) when any of the new dot area ratios $A_{Y4}'$, $A_{M4}'$, $A_{C4}'$ becomes negative, a step of making this negative dot area ratio zero and adding this dot area ratio to $A_{K4}$; and ③ when $A_{K4}$ becomes negative, a step of making $A_{K4}$ zero;

whereby a color outside said color reproducing area of three colors Y, M, C, which closely resembles a target color, is reproduced;

further said color image reproduction method being characterized in that dot area ratios are obtained from said biquadratic Neugebauer equations with four unknowns by the following steps:

① a step of obtaining initial dot area ratios of the four colors Y, M, C, K based on tristimulus values X, Y, Z of a target color to be reproduced;

② a step of obtaining amounts of deviation from dot area ratios found from the initial dot area ratios and the Neugebauer equations based upon the following reversed matrix:

$$\begin{bmatrix} \partial A_i \\ \partial A_j \\ \partial A_k \end{bmatrix} = \begin{bmatrix} mX_i & mX_j & mX_k \\ mY_i & mY_j & mY_k \\ mZ_i & mZ_j & mZ_k \end{bmatrix}^{-1} \begin{bmatrix} \partial X \\ \partial Y \\ \partial Z \end{bmatrix}$$

derived from biquadratic Neugebauer equations with four unknowns, namely $$X = f_X(A_Y, A_M, A_C, A_K)$$

$$Y = f_Y(A_Y, A_M, A_C, A_K)$$

$$Z = f_Z(A_Y, A_M, A_C, A_K)$$

in which any one of $A_Y$, $A_M$, $A_C$, $A_K$ is taken as being a constant and the other three are taken as being variables, where (i) $mX_i$, $mX_j$, $mX_k$, $mY_i$, $mY_j$, $mY_k$, $mZ_i$, $mZ_j$, $mZ_k$ are obtained by partially differentiating Neuqebauer equations at the dot area ratio of any of $A_Y$, $A_M$, $A_C$, $A_K$;

(ii) $\partial X$, $\partial Y$, a $\partial Z$ are amounts of deviation between tristimulus values of a color reproduced at the initial dot area ratios and tristimulus values of a target color to be reproduced; and (iii) $\partial A_i$, $\partial A_j$, $\partial A_k$ are amounts of deviation from dot area ratios obtained from the initial dot area ratios and the Neugebauer equations;

③ a step of obtaining dot area ratios from the obtained amounts of deviation of the dot area ratios and the initial dot area ratios; and ④ reproducing the target color from said obtained dot area ratios.

5. A color image reproduction method which reproduces a target color by using inks of the four colors Y, M, C, K, including the steps of:

taking cubic Neugebauer equations with three unknowns, from biquadratic Neugebauer equations with four unknowns, in which initial dot area ratios of the four colors, Y, M, C, K are taken respectively as being $A_{Y0}$, $A_{M0}$, $A_{C0}$, $A_{K0}$ and an initial dot area ratio $A_{K0}$ of black (K) is taken as being a constant $$A_{K0} = 0,$$

obtaining dot area ratios $A_{Y3}$, $A_{M3}$, $A_{C3}$ from said cubic Neugebauer equations with three unknowns, and obtaining a dot area ratio $AK_4$ of K by multiplying a minimum value of the obtained dot area ratios $A_{Y3}$, $A_{M3}$, $A_{C3}$ by a black ratio $K_1$, further comprising the following steps:

① a step of obtaining new dot area ratios $A_{Y4}'$, $A_{M4}'$, $A_{C4}'$ from biquadratic Neugebauer equations with four unknowns, in which initial dot area ratios are taken respectively as being $$A_{Y4} = (A_{Y3} - PA_{K4})/(1 - pA_{K4})$$

$$A_{M4} = (A_{M3} - pA_{K4})/(1 - PA_{K4})$$

$$A_{C4} = (A_{C3} - PA_{K4})/(1 - PA_{K4})$$

where P is a constant ranging from 0.9 to 1.0, and $A_{K4}$ is taken as being a constant;

whereby reproduced color is realized in a color reproducing area of three color Y, M, C;

② when any of the new dot area ratios $A_{Y4}'$, $A_{M4}'$, $A_{C4}'$ becomes negative, a step of making this negative dot area ratio zero and adding this dot area ratio to $A_{K4}$; and ③ when $A_{K4}$ becomes negative, a step of making $A_{K4}$ zero;

whereby a color outside said color reproducing area of three colors Y, M, C, which closely resembles a target color, is reproduced.

* * * * *

UNITED STATES PATENT AND TRADEMARK OFFICE
CERTIFICATE OF CORRECTION

PATENT NO. : 5,355,440

DATED : October 11, 1994

INVENTOR(S) : Kazuo Sayanagi, et al.

It is certified that error appears in the above-identified patent and that said Letters Patent is hereby corrected as shown below:

In Figure 1:  Change the subscript "X" in box S3 to a symbol of multiplication;

Change the number "20" in box S5 to --0.2--;

Add a question mark --?-- to box S8;

Change the bottom rectangular box with the term "END" therein to have round side edges;

In Figure 2:  Add the capital letter --C-- on the boundary line of the color point c to appear as in the same manner as "Y" and "M"; and In Figure 3:  Partially delete the vertical line between the boxes S3 and S5

Signed and Sealed this

Fourth Day of April, 1995

Attest:

BRUCE LEHMAN

*Attesting Officer*    *Commissioner of Patents and Trademarks*